Nov. 27, 1934.  C. H. WILSON ET AL  1,982,185
METHOD AND APPARATUS FOR UTILIZING LIGHT CONTROLLED
MEANS FOR CONTROLLING RECORDERS
Original Filed Dec. 14, 1928
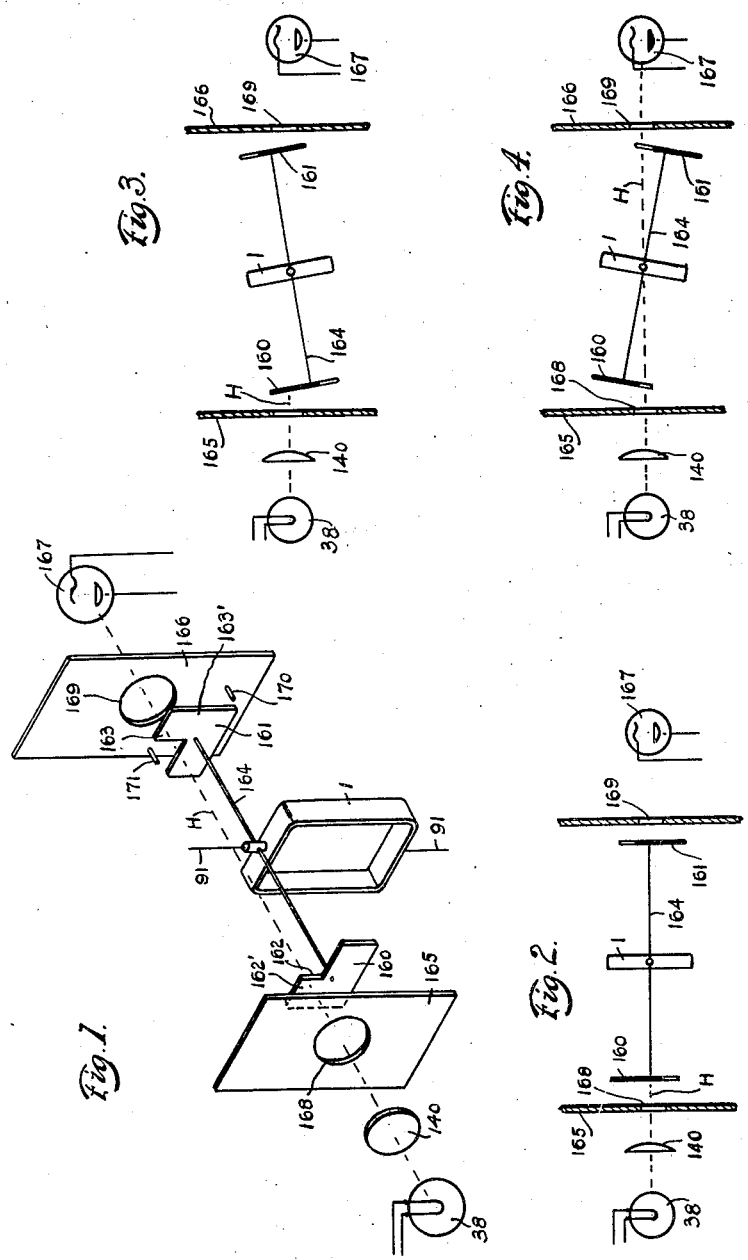
INVENTORS;
*Charles H. Wilson,*
*Cuthbert J. Brown.*
By *Harold D. Penney*, ATTORNEY.

Patented Nov. 27, 1934

1,982,185

UNITED STATES PATENT OFFICE 1,982,185

METHOD AND APPARATUS FOR UTILIZING LIGHT-CONTROLLED MEANS FOR CONTROLLING RECORDERS

Charles H. Wilson, Pelham, N. Y., and Cuthbert J. Brown, Foxboro, Mass., assignors to The Foxboro Company, Foxboro, Mass., a corporation of Massachusetts Original application December 14, 1928, Serial No. 326,074, now Patent No. 1,930,496, dated October 17, 1933. Divided and this application September 30, 1933, Serial No. 691,584

9 Claims. (Cl. 250—41.5)

Our present invention relates to an improvement in method and apparatus for utilizing light-actuated means for causing controlled actuation of recorders, recording chronographs, autograph recorders, repeaters, pyrometer controls of the automatic furnace-temperature control type, and similar instruments of the above noted class, wherein various kinds of records and analyses are made, to which such appliances may be directed.

The invention relates more particularly to matter divided from our U. S. patent application Serial No. 326,074, filed Dec. 14, 1928, for Temperature controller recorder including method and apparatus, which application has issued into Patent No. 1,930,496.

In said patent the present invention was shown as adapted to control temperature recording apparatus as utilized in conjunction with an automatic temperature controlling system of novel design, primarily adapted to control the temperatures of industrial furnaces. In this particular system of the patent, the predetermined temperature desired is set by manually controlled means which are related to control contacts in such system, and by means of a furnace thermocouple in control of a galvanometer, operating under the so-called null method, the deflections of the thermocouple influenced galvanometer, which delicate element is freed of all mechanical incumbrance, affect the system to maintain furnace temperatures within desired limits, as described in said patent.

In said patent, there are shown a fixed source of light and light-actuated, current-passing means in a control circuit, such light-actuated means being in either the form of the well known selenium cell or its improved equivalent, the photoelectric cell, whereby a galvanometer, operating under the influence of currents generated by a furnace heated thermocouple of any suitable type, and carrying a light reflecting means or a light intercepting means, causes initiating control operation, and cycle, of a series of associate circuits and mechanism whereby to regulate furnace temperatures, whether the source of furnace heat be oil or gas fuel, electric or steam, and regardless of the kind of mechanical means involved to control the heat sources.

In said patent are shown various means controlled by the galvanometer for controlling said light, whereby said galvanometer is relieved of all unnecesary load in its performance of intermittent control of the operation of associate devices and which, in its present adaptation, is utilized only to cut off or expose or deflect a beam of light to the light sensitive means. Thus, the galvanometer is subjected to no restraint whatever, except as to predetermined limitation of its amplitude of oscillation by stops provided for this purpose.

Objects of the present invention are to provide an improved well balanced screen or eclipsing means as shown in Figs. 12 to 15 of said patent for the control of light falling on a single light sensitive means as in, for example, the system shown in Fig. 4 of said patent. Other objects will appear as the description proceeds.

In the accompanying drawing,

Fig. 1 shows a diagrammatic view of a modified galvanometer control mechanism for the system shown in Fig. 4 of said patent showing a galvanometer actuated, balanced shutter means;

Figs. 2, 3 and 4 are plan views of the mechanism in Fig. 1 showing, diagrammatically, certain steps in the operative scope and range of the latter modification.

Herein is shown a modification of the galvanometer controlled mechanism as disclosed in Fig. 4, of said patent. In the herein form, a pair of axially opposed screens or shutters 160, 161 are affixed to the galvanometer shaft 164 for movement therewith. The shaft 164 is attached to the galvanometer 1, which is pivotally supported upon suspension wires 91. The coil and shutter assembly is mounted between a pair of diaphragm stops 165, 166, both of which are provided with diaphragm apertures 168, 169 respectively.

The two aligned shutters 160, 161 are provided with cut-out sections 162 and 163, whereby to pass light through apertures 168, 169 when the galvanometer is out of zero position. When the galvanometer is moved into zero position, the baffle portions 162'—163' are brought into light axis H, and prevent light from passing to the single photoelectric cell 167. This arrangement permits of providing twice the amount of light opening to the photoelectric cell for the same amount of galvanometer deflection as hereinbefore, and at greater speed.

Shutter limiting stops 170, 171 are mounted upon the baffle 166, adjacent the shutter 161, to limit the deflection of the galvanometer, as heretofore.

The detailed operation of this modification is shown in the plan views in Figs. 2, 3 and 4. When the coil is in rest or zero position, Fig. 13, light passes through diaphragm 168, but is prevented from passing further through diaphragm 169 to cell 167 by the blocking action of the portions 162'—163' of the shutters 160—161.

In the plan view, Fig. 3, the coil 1 and shutter 160—161 are shown to have been deflected out of zero position to render cell 167 inactive. In this position the baffle portions 162'—163' of the shutter prevent the light passing through aperture 166 to the cell 167.

In the plan view, Fig. 4, the shutters are shown in opposite or cell activating position, the galvanometer coil 1 having been moved to opposite position to that shown in Fig. 3, the baffles 160, 161 being deflected out of the path of beams H thereby uncovering the apertures 168—169 and passing light from 38 through to cell 167.

It should be understood that our invention is not limited to the specific details illustrated or to the specific arrangement thereof, since various modifications may be made therein within the spirit of the invention and the scope of the appended claims.

We claim as our invention:

1. A light responsive control comprising a light receiving device; a source of light; a movable member; and screens disposable between and aligned with said source and device when said member is in one position; and means whereby movement of said member in one direction only moves said screens in opposite directions out of alinement with said device and light source.

2. A light responsive control comprising a light sensitive device; a source of light; a movable member; and screens disposable between and aligned with said source and device when said member is in one position; and means whereby movement of said member moves said screens in opposite directions out of alinement with said device and light source to permit the light to reach said device.

3. In combination light receiving device; a source of light; a movable member; and screens disposable between and aligned with said source and device when said member is in one position; and means whereby movement of said member moves said screens in opposite directions out of alinement with said device and light source.

4. A light responsive control comprising a light sensitive means; a source of light; a member adapted to be deflected; and screens operatively associated with said coil, said screens obstructing the passage of light from said source to said cell when said member is in one position, deflection of said member in one direction only placing said screens out of alinement with said cell and source thereby subjecting the cell to the action of the light source.

5. A light responsive control comprising a photo-electric cell; a source of light; a galvanometer coil adapted to be deflected; a shaft intermediately carried by said coil and projecting at both ends radially to the axis of deflection of the coil; and screens carried on said ends respectively and obstructing the passage of light from said source to said cell when said coil is in one position, deflection of said coil placing said screens out of alinement with the cell and light source.

6. A light responsive control comprising a photo-electric cell; a source of light; a galvanometer coil adapted to be deflected; apertured means positioned between said source and coil; and between said coil and cell; and means having cut away portions associated with said coil, said cut away means obstructing the passage of light from said source to said cell when said coil is in non-deflected position, deflection of said coil in one direction only, placing said cut away portions in alinement with said apertures thereby subjecting the cell to the action of the light source.

7. A light responsive control comprising a photo-electric cell; a source of light; a galvanometer coil adapted to be deflected; a partition having an aperture therein positioned between said source and coil; a second apertured partition positioned between said coil and cell, the apertures of both partitions, being in alinement; and means having cut away portions carried by said coil, said means obstructing the passage of light from said source to said cell when said coil is in non-deflected position, deflection of said coil in one direction only, placing said cut away portions in alinement with said apertures thereby subjecting the cell to the action of the light source.

8. A light responsive control comprising a photo-electric cell; a source of light; a galvanometer coil adapted to be deflected; a shaft carried by the coil; a partition having an aperture therein positioned between said source and coil; a second apertured partition positioned between said coil and cell, the apertures of both partitions, being in alinement with said source and cell and screens on said shaft obstructing the passage of light from said source to said cell when said coil is in non-deflected position, deflection of said coil in one direction only, placing said screens out of alinement with said apertures thereby subjecting the cell to the action of the light from source.

9. A light responsive control mechanism comprising a photoelectric cell; a source of light; a lens to concentrate light from said source on said cell; a galvanometer coil adapted to be deflected; a partition having an aperture therein positioned between said lens and coil; a second apertured partition positioned between said coil and cell, the apertures of both partitions, source lens and cell being in alinement; a shutter rod associated with said coil and normal to the plane thereof; and a shutter having a cut away portion associated with said rod at each end thereof, said shutters obstructing the passage of light from said source to said cell when said coil is in non-deflected position, deflection of said coil in one direction only placing said cut away portions in alinement with said apertures thereby subjecting the cell to the action of the light source.

CHARLES H. WILSON.
CUTHBERT J. BROWN.